United States Patent [19]

Boyajian

[11] 3,804,546
[45] Apr. 16, 1974

[54] DRILL GUIDE
[75] Inventor: Alfred Z. Boyajian, Manhattan Beach, Calif.
[73] Assignee: Boyan Limited, Nassau N.P., Bahamas
[22] Filed: Jan. 28, 1972
[21] Appl. No.: 221,626

[52] U.S. Cl. ............................................... 408/115
[51] Int. Cl. ........................................... B23b 49/00
[58] Field of Search ........... 408/72, 115, 76; 29/271

[56] References Cited
UNITED STATES PATENTS

| 437,796 | 10/1890 | Preston | 408/72 |
|---|---|---|---|
| 550,767 | 12/1895 | Thielscher | 408/115 X |
| 2,966,815 | 1/1961 | Ramien | 408/72 |
| 2,977,825 | 4/1961 | Buck | 408/76 |
| 3,192,640 | 7/1965 | Fournier | 408/72 X |
| 3,626,513 | 12/1971 | Pytlak | 408/115 |
| 3,661,469 | 5/1972 | Leff et al. | 408/72 |
| 3,670,390 | 6/1972 | Brzoska | 29/271 |
| 3,674,376 | 7/1972 | Silken | 408/115 |

Primary Examiner—Andrew R. Juhasz
Assistant Examiner—Horace M. Culver
Attorney, Agent, or Firm—Robert T. Gammons, Dike, Bronstein, Roberts & Cushman

[57] ABSTRACT

A drill guide for electric hand drills comprising a rigid block containing at least one hole within which a drill is adapted to be supported at a predetermined position with respect to the surface to be drilled and a stabilizing arm in the form of a handle mounted to the block and provided at its distal end with a bearing adapted, when held against a stationary surface spaced from the block, to prevent tilting of the block relative to the surface to be drilled.

3 Claims, 9 Drawing Figures

PATENTED APR 16 1974
3,804,546
SHEET 1 OF 2
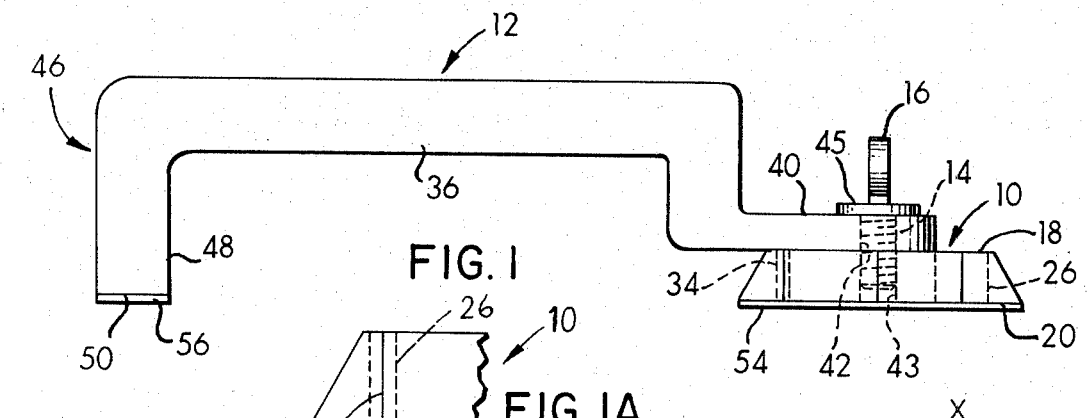
FIG. 1
FIG. 1A
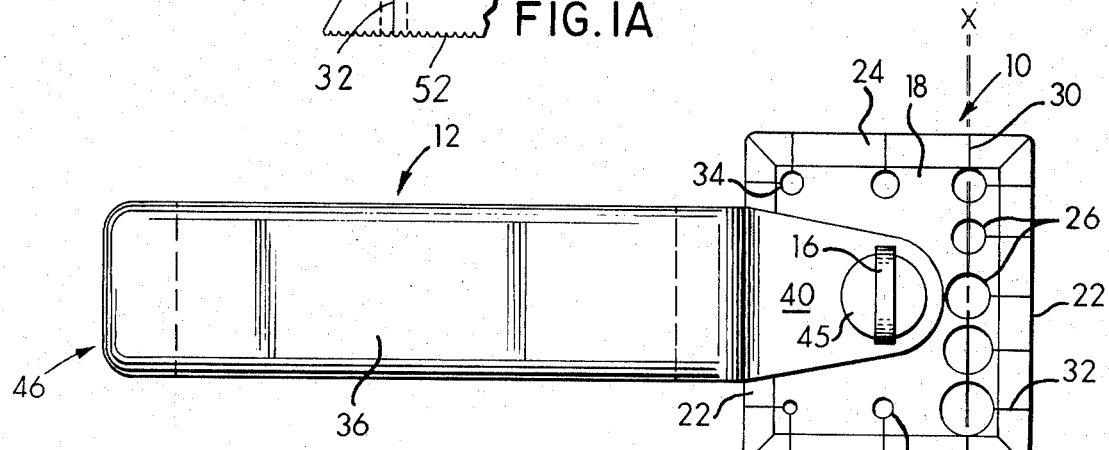
FIG. 2
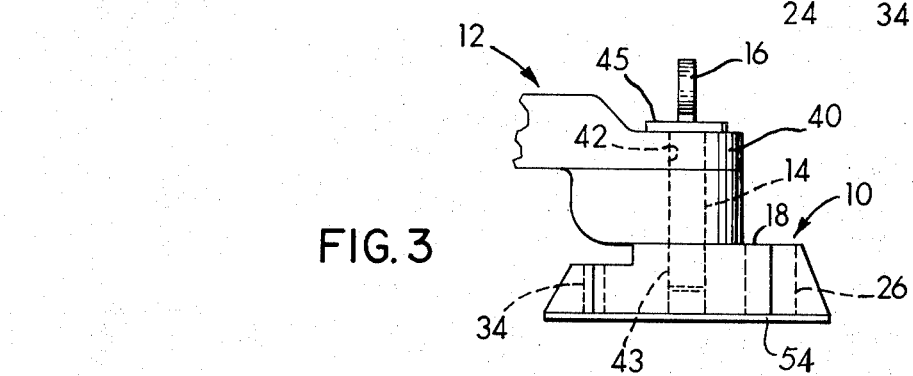
FIG. 3
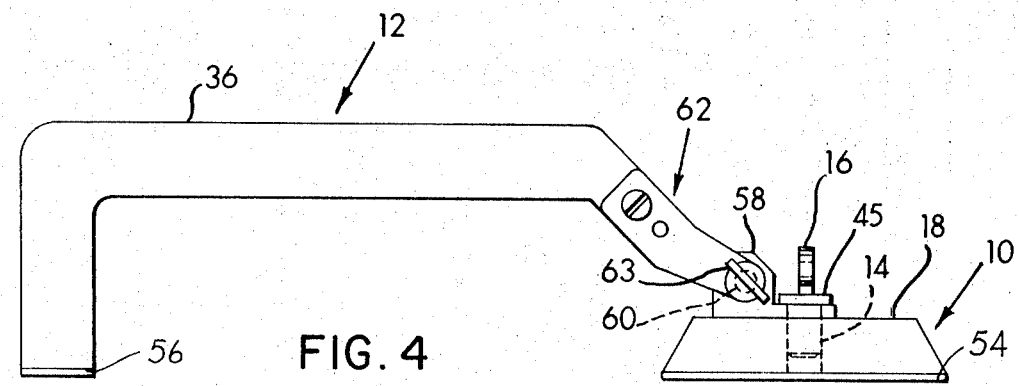
FIG. 4

DRILL GUIDE

BACKGROUND OF THE INVENTION

Drill guides designed to assist accurately positioning a drill and controlling the direction and course of the drill during a drilling operation are shown, for example, in U.S. Pat. Nos. 437,796, 2,273,954, 2,466,023 and 2,733,517. However, such devices as are illustrated in these patents have limited usefullness since they do not enable accurately and precisely locating the axis of the drill guide hole with the punch center representing the spot on the workpiece to be drilled.

The purpose of this invention is to provide a drill guide designed especially for power hand drills which will enable locating the drill precisely with respect to the spot marked for drilling; which will enable commencing the drilling operation without the aid of a center punch; which will maintain the drill in a precise predetermined position with respect to the surface to be drilled during the drilling operation whether flat or curved and without deviation; which will eliminate bell mouth and out of round holes; which will assist in selecting proper drill size and which is versatile, inexpensive to manufacture, durable and attractive in appearance.

SUMMARY

A drill guide comprising a rigid block containing at least one hole extending from the top side perpendicularly to the bottom side, said block being adapted to be positioned adjacent a surface to be drilled with the axis of the hole perpendicular to said surface and said hole being adapted to receive a drill for rotational and axial movement therein and to support and guide the drill perpendicular to said bottom side and stabilizing means mounted to the block adapted when held against a stationary surface spaced from the block to prevent tilting of the block relative to the surface to be drilled. Desirably there are lines scribed on the top of the block intersecting at right angles to each other at the geometrical center of the hole for assisting in aligning the center of the hole with the spot to be drilled. The edge face of the block is beveled and the scribed lines extend downwardly along these beveled surfaces to enable matching them with scribed lines on the surface of the work for aligning the center of the hole precisely with the spot to be drilled. Means is provided to prevent relative movement of the block on the surface in the plane of the surface and may comprise knurling on the bottom side of the block or a friction pad attached thereto. In its preferred form the block contains a plurality of holes arranged in a series graduated in size according to the size of successive twist drills of a standard set of twist drills. The block may be rectangular in configuration and there may be one or more series of holes arranged along one or more edges of the block or may be circular in configuration with a series of holes arranged peripherally thereof. The stabilizing means and block are adapted to be disposed at any angle relative to each other about an axis perpendicular to the bottom side of the block and there is means for releasably fixing them in a selected angular position. The stabilizing means comprises a rigid elongate member connected at one end to the block and provided at its distal end with a bearing and provides a handle for supporting the block adjacent to the surface to be drilled and the bearing engaged with a stationary surface which prevents tilting of the block relative to the surface to be drilled during the drilling operation. In one form of the invention the proximal end of the handle is pivotally connected to the block for angular movement of the handle and block relative to each other about an axis parallel to the lower surface of the block. Means is provided for locking the proximal end of the handle relative thereto to change its effective length. Additional stabilizing means in the form of an elongate bar may be pivotally connected to the block together with the proximal end of the handle, the bar providing at its opposite ends bearings adapted to be held engaged with the stationary surface.

The invention will now be described in greater detail with reference to the accompanying drawings wherein:

FIG. 1 is a side elevation of the drill guide in one form;

FIG. 1a is a fragmentary elevation, to larger scale, showing a knurling on the bottom side of the blank;

FIG. 2 is a plan view of the drill guide shown in FIG. 1;

FIG. 3 is a fragmentary elevation of a modified form of drill guide shown in FIG. 1;

FIG. 4 is an elevation of a drill guide provided with an adjustment enabling its use on a surface having different levels;

Figure 6:
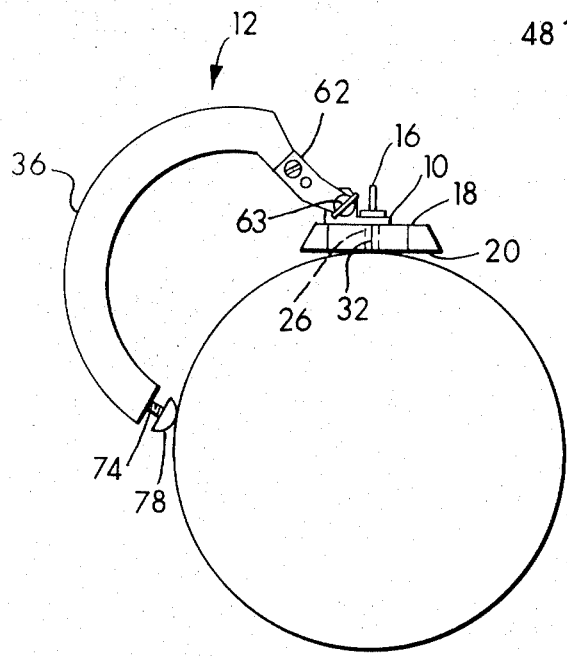
FIG. 6 is an elevation of a drill guide adapted particularly for use on curved surfaces.

Referring to the drawings (FIGS. 1 and 2), the drill guide comprises a rigid block 10 and stabilizer 12 secured to each other by a threaded bolt 14 provided with a flat head 16.

The block 10 is of rectangular configuration having spaced parallel flat upper and lower sides 18 and 20 and spaced parallel beveled side and end faces 22—22 and 24—24. Along one of the sides 22 there are graduated holes 26 extending from the top side to the bottom side and perpendicular to the bottom side, the centers of which lie on a common center line X—X parallel to that side inscribed on the top side. At the ends of the scribed center line X—X there are inscribed on the beveled end faces 24—24 indicia 30—30 and on the side face 22 there are inscribed indicia 32 which intersect the center line X—X at the centers of the holes at right angles to the center line X—X. The indicia 30, 32 provide for aligning each hole with the place to be drilled. Additional holes 34 are shown at the opposite edge 22 and the opposite ends 24—24. It is to be understood, of course, that as many holes as are desirable may be employed and these may be arranged in different graduated series. While the holes, as shown, are formed in the block with their axes perpendicular to the lower side 20 it is to be understood that if it is desirable to provide for drilling holes at an angle the holes in the block may be formed therein with their axes at the desired angle for drilling.

The block is in the order of ⅜ of an inch in thickness and in order to provide for free rotational and axial movement of the drill in the holes in which they are intended to function, a sliding fit with a clearance in the order of 0.001 to 0.002 is desirable. With a clearance of this order the length of the hole should be at least approximately twice the mean of the diameters of the drills in a series and if thus dimensioned will maintain axial alignment of the drill with the axis of the hole within approximately one-half degree.

In order to achieve the foregoing, that is, to maintain a hole length which is approximately twice the diameter of the drill the block, as shown in FIG. 3, may have different thicknesses so that the series of holes of larger diameter along the forward edge of the block are in the thicker portion of the block and the series of holes of smaller diameter at the rear edge of the block are in a thinner portion thereof.

The stabilizer 12 is in the form of a rigid handle of elongate construction having a portion 36 adapted to be grasped. At one end of the handle there is a tapered portion 40 containing a mounting hole 42 of smooth bore for rotatably receiving the threaded bolt 14 and at the other end there is a bearing element 46. The block contains a threaded mounting hole 43, the axis of which is located substantially at the geometrical center of the block and perpendicular to the bottom side into which the bolt 14 is adapted to be screwed to secure the handle in fixed relation to the block. A shoulder 45 at the underside of the head 16 is provided to obtain a clamping action such as to prevent rotation of the block relative to the end of the handle. As thus fastened the handle and block may be rotated relative to each other about the axis of the bolt perpendicular to the bottom side of the block to dispose them in any desired angular relation to each other. The bearing element, as shown in FIGS. 1 and 2, comprises a short leg 48 at the distal end of the handle of such length that its lower end 50 lies in the plane of the lower side 20 of the block 10 and its lateral spacing affords a stabilizing effect which prevents tilting the block when the block is held by the handle with the block adjacent the surface to be drilled and the bearing against a stationary surface.

To prevent relative movement of the block in the plane of its lower side relative to the surface to be drilled the lower side is provided with knurling 52 (FIG. 1a) or otherwise roughened, or has applied thereto a pad of rubber 54 or equivalent frictional material. Desirably the end of the stabilizing leg 48 is also knurled or provided with a frictional surface 56 so that it will not slip relative to the stationary surface with which it is held engaged.

Figure 7:
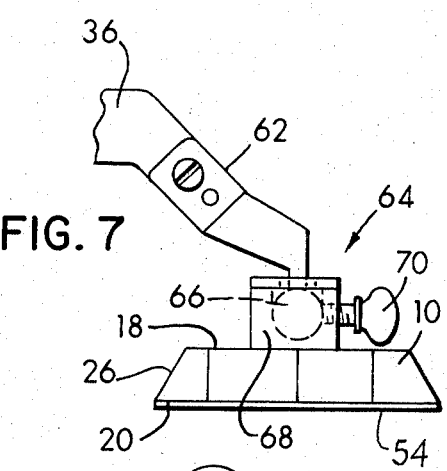
FIG. 7 is a fragmentary elevation of a ball and socket connection between the drill guide and the handle.

The drill guide thus far described is designed for use on flat surfaces all in one plane. To provide for surfaces at different levels, for example stepped flat surfaces, or for curved surfaces, the stabilizer 12 is connected to the block 10 such that it is angularly movable relative to the block about an axis parallel to the lower side thereof. Ond form of pivotal connection is illustrated in FIG. 4 wherein there is a part 58 secured to the top side of the block for receiving a pivot pin 60 having a head at one end and threads at the other. A pair of angle plates 62 are bolted or otherwise fastened to the proximal end of the arm 36 and extend forwardly and downwardly therefrom at an angle to the axis of the arms. At the distal ends of the angle plates there are holes adapted to receive the pivot pin 60. A thumb nut 63 mounted on the threaded end of the pivot pin provides for making the pivotal connection rigid. As thus constructed, the block and handle can be rotated relative to each other about the vertical axis of the screw 14 and about the horizontal axis of the pivot pin 60. Alternatively, as shown in FIG. 7, the handle 36 may be connected to the block 10 by a universal joint 64 such as a ball 66 and socket 68. A set screw or thumb screw 70 threaded into the socket against the ball provides for making the connection rigid.

Figure 5:
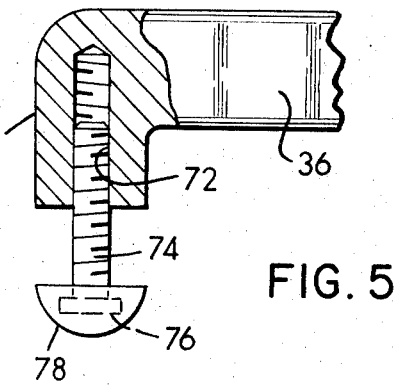
FIG. 5 is a fragmentary elevation showing alternate means for adapting the drill guide for use on surfaces of different elevations.

FIG. 5 shows an alternative structure for obtaining substantially the same purpose wherein the leg 48 at the distal end of the handle 36 contains a threaded opening 72 in which there is inserted a screw-threaded bolt 74 having at its lower end a head 76 to which is applied a bearing cap 78. By rotating the screw the distance of the cap 78 from the lower end of the leg 48 may be varied to increase or decrease the effective length of the leg and hence of the handle according to the difference in levels of the surface on which the drill guide is being used.

For a cylindrical or spherical surface the configuration of the handle may be changed somewhat as shown in FIG. 6, for example, by making it arcuate so as to follow to some degree the curved surface on which the device is being used. In this form of the invention it is desirable to have the proximal end of the handle secured thereto by a pivot pin such as shown in FIG. 4, or a universal joint such as shown in FIG. 7, and to have at the end of the leg the adjustably threaded bearing shown in FIG. 5.

Figure 8:
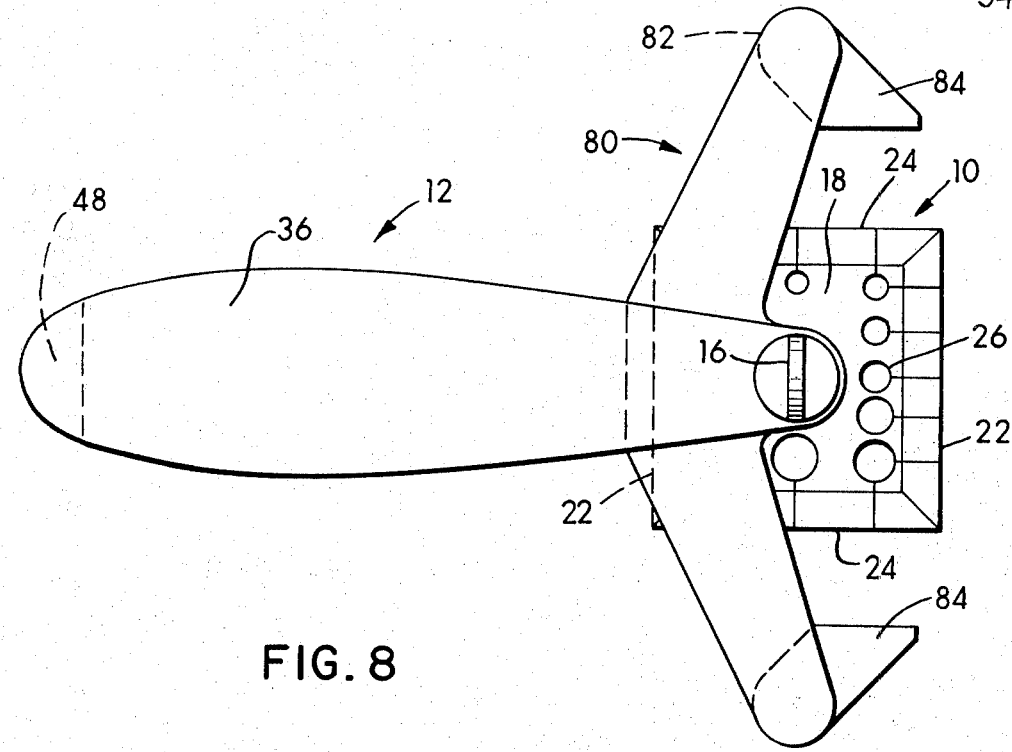
FIG. 8 is a plan view of a drill guide provided with auxiliary stabilizing means.

FIG. 8 shows a modification provided with an auxiliary stabilizer 80 which comprises an elongate bar interposed between the proximal end of the handle 36 and the block 10 and which contains a vertically disposed hole through which the screw bolt 14 passes. The stabilizer bar 80 is disposed at right angles to the axis of the handle 36 and has at its opposite end short legs 82—82, the lower ends of which are bearing members 84—84 which lie in the same plane as the lower surface of the leg 48 at the distal end of the handle. This structure affords the advantage that the three-point bearing support makes it possible to hold the lower side of the block 10 in spaced relation to the surface to be drilled and in fixed parallel relation thereto with the drill receiving hole perpendicular to the surface so that any local irregularities in the surface to be drilled will not affect the precision and/or a surface may be drilled which is of a kind such that it is undesirable to apply pressure to it.

It should be understood that the present disclosure is for the purpose of illustration only and that this invention includes all modifications and equivalents falling within the scope of the appended claims.

I claim:

1. A drill guide comprising a rigid block having flat top and bottom surfaces, the bottom surface being larger than the top surface and a peripheral edge surface sloping downwardly from the top surface to the bottom and intersecting the bottom surface at an acute angle, said block containing a plurality of vertically disposed smooth bore holes extending from the top surface to the bottom surface, said holes being located adjacent the edge face surface and of a diameter corresponding to the diameters of the drill bits of the standard set of drill bits, gauge lines on the sloping edge surface of the block extending from the line of intersection of the sloping surface with the bottom surface continuously up the sloping surface, projections of said lines on the top surface intersecting each other at the geometric centers of the holes and at right angles such that the center of each hole is represented by two right angular disposed gauge lines on the sloping surface of the block which enables centering the holes on the work to be drilled, said block containing a geometrically centered vertically disposed threaded hole from its top surface to its bottom surface, an elongate rigid handle having at one end a vertically disposed smooth bore hole, a thumb screw extending through the smooth bore hole in the end of the handle into the threaded hole in the block for binding the block to the handle with the handle positioned at any desired angular position about a vertical axis coinciding with the axis of the thumb screw, said handle extending radially from the geometric center of the block and a flat bearing surface at the other end of the handle lying in a common plane with the bottom surface of the block for supporting the block in a fixed position relative to the surface to be drilled, said handle having a portion intermediate its ends upwardly offset from the plane of the bottom surfaces of the block and the bearing surface providing a hand grip for gripping the guide and holding it in a fixed position during drilling operations.

2. A drill guide according to claim 1, comprising traction means on the lower surface of the block for resisting movement of the block relative to the surface to be drilled.

3. Apparatus according to claim 1, wherein a screw bolt is adjustably threaded into the flat bearing surface at the other end of the handle with its axis perpendicular to said bearing surface.

* * * * *